April 16, 1940.   W. T. BIRCH   2,197,606

PUMP VALVE

Filed June 29, 1938

Inventor
William T. Birch
Charles W. Hills
Attorney

Patented Apr. 16, 1940

2,197,606

UNITED STATES PATENT OFFICE 2,197,606

PUMP VALVE

William T. Birch, Chicago, Ill.

Application June 29, 1938, Serial No. 216,557

1 Claim. (Cl. 251—144)

This invention relates to pump valves for the large reciprocating type of pumps such as are installed in municipal water pumping stations.

It is an important object of this invention to provide a pump valve having an outer and annular seat on an annular body, and having an inner seat and stem support anchored to the annular body by only a pair of ribs to permit of maximum possible flow of water through the body.

It is also an important object of this invention to provide a valve assembly having a spindle under tension and provided with stiffening means capable of protecting the spindle against wear.

It is also an important object of this invention to provide a valve assembly with improved spring guide means.

Other and further important objects and features of this invention will be apparent from the disclosures in the specification and the accompanying drawing.

This invention is illustrated in the drawing and hereinafter more fully described.

Figure 1:
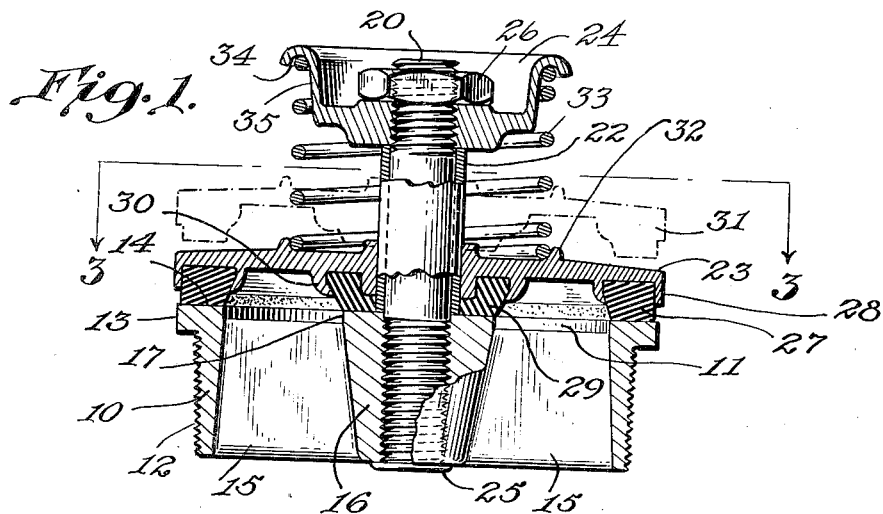
Figure 1 is a sectional vertical view of the complete valve, with parts in plan and parts broken.
Figures 2, 3:
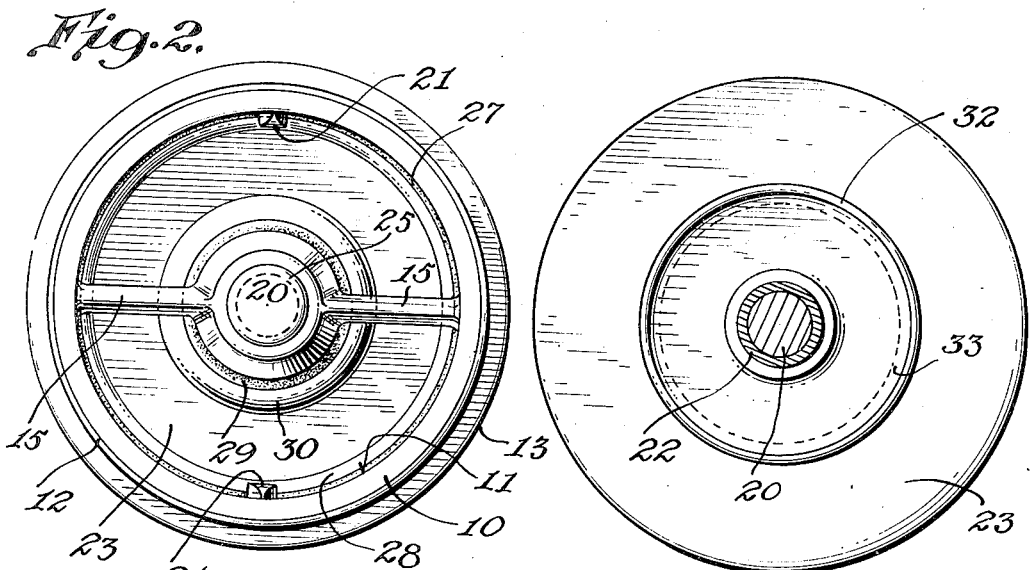
Figure 2 is a bottom plan view of the valve seat, looking up through the bottom of the valve assembly.
Figure 3 is a top plan view looking down on the valve disk, with parts in section.

In Figure 1, a valve assembly is shown for use in the valve chest of large reciprocating pump units such as are used in municipal pumping plants.

Figure 4:
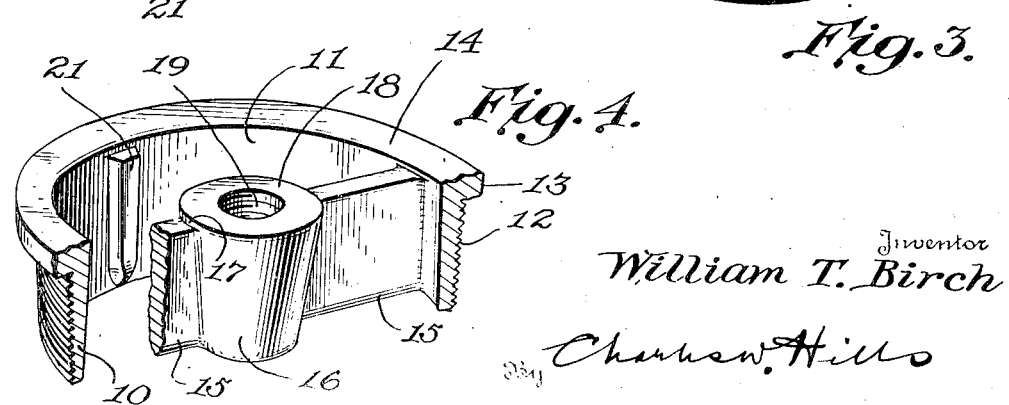
Figure 4 is a perspective view of the valve seat, with parts in section and parts broken.

The valve assembly includes an annular body 10, best shown in Figure 4, having an inner face 11 and provided on its outer periphery with threads 12 so that it may be screwed into an appropriate opening in a valve chest. The body 10 is provided with an outwardly extending annular flange 13, the upper face of which defines an outer and primary valve seat 14, and with a pair of integrally connected and aligned ribs 15 which are connected at their inner ends by a conical body 16, and which have their upper faces disposed below the level of the seat 14.

The upper end of the conical body 16 extends above the upper edge of the ribs 15, as at 17, and the upper end of the body 16 is faced to provide an inner and secondary valve seat 18. The body 16 is provided with a central and threaded bore 19 to receive and support a valve spindle or stem 20.

The annular body 10 is provided with a pair of driving lugs 21 which are disposed in space quadrature with the ribs 15. The upper end of each lug 21 is disposed below the annular seat 14, and the lugs are tapered to offer the least possible resistance to water flow.

The face 18 of the conical body 16 also provides a seat or support for a renewable sleeve 22 which is disposed about the spindle 20 to form a guide for a valve disk 23, and so provide a limit stop for a dished nut 24.

The spindle 20 has a threaded lower end threadedly entered in the bore 19 of the conical body 16, and a portion of the lower end of the spindle projects below the lower end of the body 16 and is peened at 25 to lock the spindle in place. The upper end of the spindle 20 is also threaded to receive the dished nut 24 and to receive a lock nut 26.

The valve disk 23 is slidably mounted on the sleeve 22, and this disk is provided with an outer and primary annular ring 27 of suitable material entered in a channel 28, and is arranged to seat on the outer seat 14 of the body 10.

The disk 23 is also provided with an inner and secondary annular ring 29 of suitable material entered in a channel 30, and is arranged to seat on the inner seat 18 of the conical body 16, to provide a substantially watertight connection about the sleeve and the seat.

The open position of the disk 23 is indicated in dotted lines at 31.

The valve disk 23 is provided with an integrally formed spring guide 32 to guidedly receive a spring 33 seated at one end on the disk 23 and seated at its other end in a curved flange 34 formed on the dished nut 24.

It will be apparent that the sleeve 22 is urged against the seat 18 by the dished nut 24 to form a rigid wear-receiving element for the disk 23.

It will also be apparent that when the nut 24 bears on the sleeve 22, it puts the spindle 20 in tension, and compresses the sleeve, thus stiffening the compound spindle and sleeve structure against vibration and side and end play.

The provision of the integrally formed spring guide 32 in substantial alignment with the seat provided by the curved flange 34, together with the substantial guiding surface provided by an upstanding wall 35 of the dished nut 24, makes for true vertical movement of the spring 33, and avoids any tendency of buckling of the spring and tilting of the disk 23 and binding of the disk on the sleeve 22.

The sleeve 22 is made of a material other than that used in the metal body of the disk 23, to reduce friction, and may be made of a material having inherent self-lubricating properties, such as a graphite-containing composition.

Since the lugs 21 are disposed in space quadrature with the ribs, it will be obvious that a turning tool inserted in the annular body to engage the lugs and the ribs will have four engaging points, ninety degrees apart, and substantially at the inner face of the body. Such an engagement will eliminate any tendency towards distorting the ribs and throwing the spindle out of alignment, and will substantially eliminate any tendency towards shearing the engaged parts as the body is forced home in a valve chest. A familiar turning tool is a length of pipe having slots cut across its end, and turned by applying a wrench to the pipe.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

A valve assembly for being removably threaded in the valve chest of a heavy-duty pump of a municipal water supply system, said valve assembly comprising an elongated cylindrical body provided with an upper end face shaped to define a primary valve seat and said body being provided with a threaded exterior surface, a single arm disposed connecting diametrically opposed points of the inner face of said cylinder and being substantially co-extensive with the length of said cylinder, a hub on said single arm and disposed at the axis of said cylinder, said hub having an upper face shaped to define a secondary valve seat, an upstanding spindle secured to said hub, a rigid metallic valve disk slidable on said spindle, a first valve means entered in said disk and engageable by said primary valve seat, a second valve means entered in said disk and engageable by said secondary valve seat, a pair only of inwardly directed lugs formed on the inner face of said cylinder, said lugs being spaced a half-circle apart and being disposed in space quadrature with said single arm and being cooperable with said arm to provide four bearing points for a tool in the turning of said cylinder while being entered in a valve chest.

WILLIAM T. BIRCH.